(12) United States Patent
Womack

(10) Patent No.: US 7,080,103 B2
(45) Date of Patent: Jul. 18, 2006

(54) PERSONAL INFORMATION MANAGEMENT SYSTEM AND METHOD WITH AUDIT FUNCTIONALITY

(75) Inventor: Nathan Paul Womack, Newport, RI (US)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 10/434,502

(22) Filed: May 8, 2003

(65) Prior Publication Data

US 2004/0225695 A1 Nov. 11, 2004

(51) Int. Cl.
*G06F 17/30* (2006.01)
(52) U.S. Cl. .................. 707/202; 707/200; 707/204
(58) Field of Classification Search .............. 707/1, 707/4, 202, 200, 204; 705/35; 708/142; 715/740, 800, 811, 863; 345/169
See application file for complete search history.

(56) References Cited

U.S. PATENT DOCUMENTS

| | | | | |
|---|---|---|---|---|
| 4,218,760 A | | 8/1980 | Levy | 715/532 |
| 5,065,360 A | * | 11/1991 | Kelly | 708/142 |
| 5,111,395 A | | 5/1992 | Smith et al. | 705/45 |
| 5,611,031 A | * | 3/1997 | Hertzfeld et al. | 715/740 |
| 5,615,384 A | * | 3/1997 | Allard et al. | 715/800 |
| 5,748,906 A | | 5/1998 | Sandig | 705/1 |
| 5,818,437 A | * | 10/1998 | Grover et al. | 715/811 |
| 5,915,245 A | * | 6/1999 | Patterson et al. | 705/35 |
| 6,085,204 A | | 7/2000 | Chijiwa et al. | 707/529 |
| 6,094,197 A | * | 7/2000 | Buxton et al. | 715/863 |
| RE37,652 E | * | 4/2002 | Kelly | 710/65 |
| 6,370,518 B1 | * | 4/2002 | Payne et al. | 707/1 |
| 6,396,482 B1 | * | 5/2002 | Griffin et al. | 345/169 |
| 6,434,552 B1 | * | 8/2002 | Leong | 707/4 |
| 6,453,280 B1 | | 9/2002 | Yang | 704/10 |

* cited by examiner

*Primary Examiner*—Jeffrey Gaffin
*Assistant Examiner*—Farhan M. Syed
(74) *Attorney, Agent, or Firm*—Duke W. Yee; David A. Mims, Jr.; Wayne P. Bailey

(57) ABSTRACT

An improved technique for facilitating user co-action with a portable electronic device having one or more embedded applications. The application presents information to the user on a display of the electronic device, and the user selects the particular item or data that they want to work with, such as by a double-tap and hold of a stylus over such item or data. In response to such tap and hold selection, a menu appears that prompts the user to select what the next action or step the user desires to invoke. User selection of the next action/step causes creation of a new data record, with information from the current application being automatically included or appended to the next action/step's application record, along with a date stamp. This enables creation of an audit trail or log of the user's actions with the electronic device's applications.

9 Claims, 7 Drawing Sheets

| Subject: | Set up Appt. | -122 |
| Start Date: | 04/14/03 | -124 |
| End Date: | 04/14/03 | -126 |
| Start Time: | 14:00 | -128 |
| End Time: | 14:10 | -130 |
| Notes: | Call Dentist | |
| 132 | | |

| Subject: | | -122 |
| Start Date: | | -124 |
| End Date: | | -126 |
| Start Time: | | -128 |
| End Time: | | -130 |
| Notes: | 04/14/03; Set Up Appt.; 04/14/03; 04/14/03; 14:00; 14:10; Call Dentist | |
| 132 | | |

| | | |
|---|---|---|
| Subject: | Spring Clean | ‒222 |
| Start Date: | 04/01/03 | ‒224 |
| End Date: | 04/28/03 | ‒226 |
| Percent Complete: | 25 | ‒228 |
| Status: | In Progress | ‒230 |
| Notes: | Clean house and garage | |
| | 232 | |

*FIG. 7*

| | | |
|---|---|---|
| Subject: | | ‒222 |
| Start Date: | | ‒224 |
| End Date: | | ‒226 |
| Percent Complete: | | ‒228 |
| Status: | | ‒230 |
| Notes: | 04/10/03; Spring Clean; 04/01/03; 04/28/03; 25; In Progress; Clean house and garage | |
| | 232 | |

*FIG. 8*

| | | |
|---|---|---|
| Subject: | Call Trash Hauler | ‒222 |
| Start Date: | 04/28/03 | ‒224 |
| End Date: | 04/28/03 | ‒226 |
| Percent Complete: | 0 | ‒228 |
| Status: | In Work Queue | ‒230 |
| Notes: | 04/10/03; Spring Clean; 04/01/03; 04/28/03; 25; In Progress; Clean house and garage | |
| | 232 | |

*FIG. 9*

| Subject: | ⬜ ⟵ 222 |
| Start Date: | ⬜ ⟵ 224 |
| End Date: | ⬜ ⟵ 226 |
| Percent Complete: | ⬜ ⟵ 228 |
| Status: | ⬜ ⟵ 230 |
| Notes: | 04/10/03; Call Trash Hauler; 04/28/03; 04/28/03; 0; In Work Queue; 04/10/03; Spring Clean; 04/01/03; 04/28/03; 25; In Progress; Clean House and Garage ⟵ 232 |

PERSONAL INFORMATION MANAGEMENT SYSTEM AND METHOD WITH AUDIT FUNCTIONALITY

BACKGROUND OF THE INVENTION

1. Technical Field

The present invention relates to information processing systems, and more particularly it relates to user information management systems, and in particular relates to a method and system for maintaining an audit trail or log of actions maintained in such a information management system.

2. Description of Related Art

Technological advances in electronics has allowed for enabling increased functionality in smaller and smaller devices. Today's laptop computers have computational functionality similar to that of room-sized computers that existed in the 1970s. Even smaller electronic devices, generally known as personal information management (PIM) devices or personal digital assistant (PDA) devices, are becoming ubiquitous, allowing users to communicate with others and perform somewhat limited computational capability, such as entering and retrieving data into applications running on the PIM/PDA such as a calendar or to-do list application. In addition, with the merger of PIM/PDA devices and cell-phone technology, phone number and address lists including email addresses can also be maintained and managed with such devices. It is also possible to play interactive media files and games on such devices. Representative PIM and PDA devices include a Palm Pilot handheld device available from Palm, Inc. and a Pocket PC device available from numerous vendors such as Hewlett Packard, Toshiba, NEC and Dell, to name just a few.

Because of the small size of these personal devices, the ability of user's to co-act with such a device is generally more restrictive than co-action methods and techniques used by traditional computers such as desktops and laptops. For example, the keyboard is typically smaller (if one even exists at all) on a PIM or PDA than it is on a laptop computer. Because of this user co-action limitation, it would be desirable to reduce the amount of user actions, such as keyboard or stylus input, required of a user to co-act with a PIM or PDA device and its associated application(s).

SUMMARY OF THE INVENTION

The present invention is directed to an improved technique for facilitating user co-action with a portable electronic device having one or more embedded applications. The application presents information to the user on a display of the electronic device, and the user selects the particular item or data that they want to work with, such as by a double-tap and hold of a stylus over such item or data. In response to such tap and hold selection, a menu appears that prompts the user to select what the next action or step the user desires to invoke. User selection of the next action/step causes creation of a new data record, with information from the current application being automatically included or appended to the next action/step's application record, along with a date stamp. This enables creation of an audit trail or log of the user's actions with the electronic device's applications.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 2 depicts detailed data entries of a calendar application data record.

FIG. 4 depicts detailed data entries of a calendar application data record, including replicated data.

FIG. 7 depicts detailed data entries of a to-do list application data record.

FIG. 8 depicts detailed data entries of a to-do list application data record, including a replicated data record.

FIG. 9 depicts detailed data entries of a to-do list application data record, including a replicated data record and subsequently added additional user information.

DETAILED DESCRIPTION OF THE PREFERRED EMBODIMENT

Figure 1:
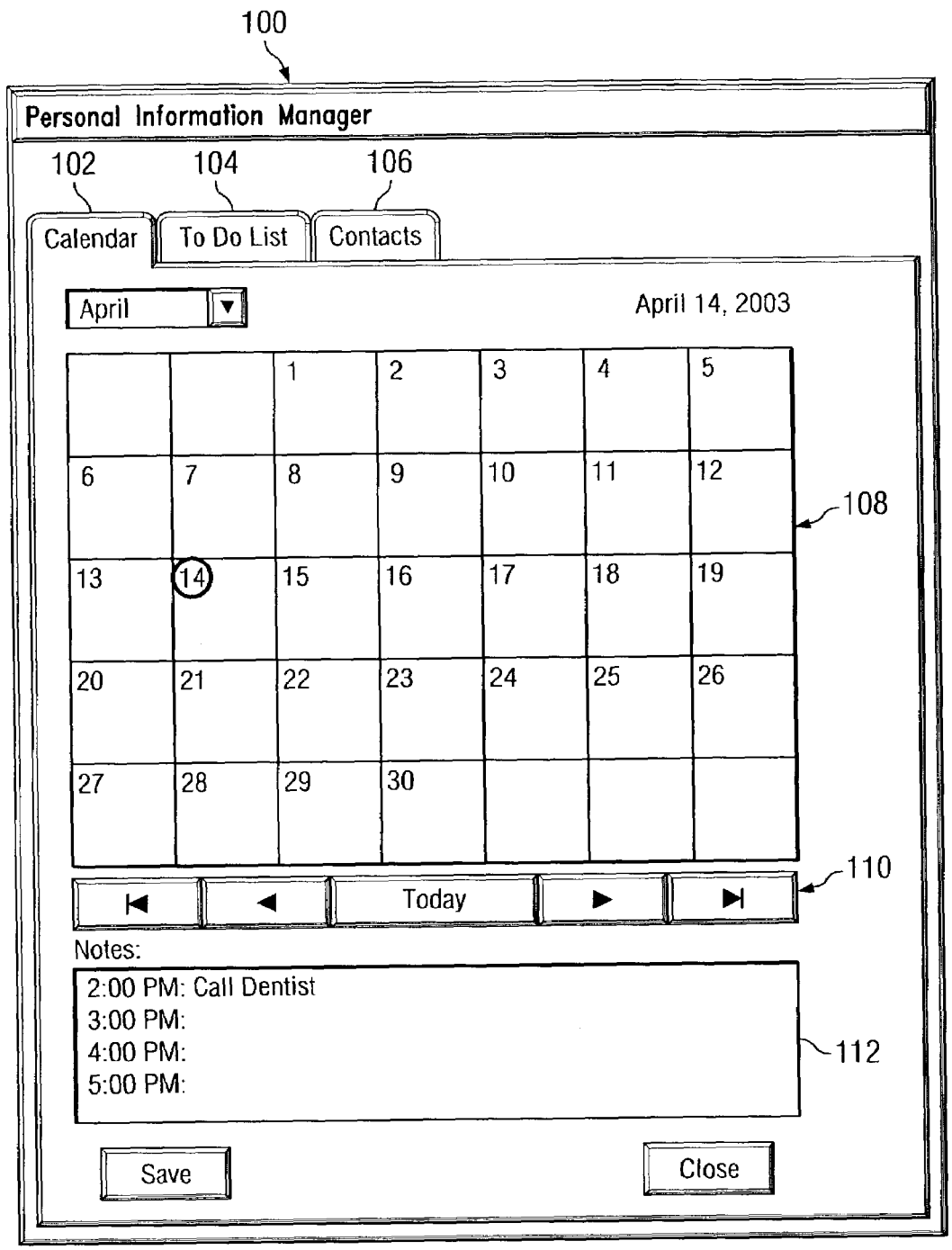
FIG. 1 depicts a display screen generated by a personal information management device application.

Referring now to FIG. 1, there is shown at 100 a typical image displayed on a personal information management (PIM) device. The calendar embedded application and its associated view has been selected by user selection of the calendar tab 102. Also shown, but not currently selected, is to-do-list tab 104 and contacts tab 106. Calendar 108 is displayed with the current date of Apr. 14, 2003 being highlighted. Control buttons 110 allow a user to scroll to other months. When a user selects a day on the displayed calendar 108, such as by using a stylus, finger, mouse or button, the notes for that particular day are displayed in the Notes window 112. In the example shown, a calendar entry has been made for Apr. 14, 2003 to call the dentist at 2:00 PM.

Referring now to FIG. 2, there is shown a representative data record 120 maintained by the PIM calendar application. This record has numerous data fields 122, 124, 126, 128, 130 and 132 for maintaining information for a given calendar entry such as the one shown in the Notes window 112 in FIG. 1. For example, field 122 is used to store the Subject of a given calendar entry, field 124 is used to store the Start Date for a given calendar entry, etc. The Notes data field 132 contains the information that is displayed in the Notes window 112 of FIG. 1. While record 120 shows the preferred embodiment for maintaining calendar information, there are numerous other ways that this information could be stored in the PIM using traditional and well know data storage techniques such as a database, linked-list, etc.

Figure 3:
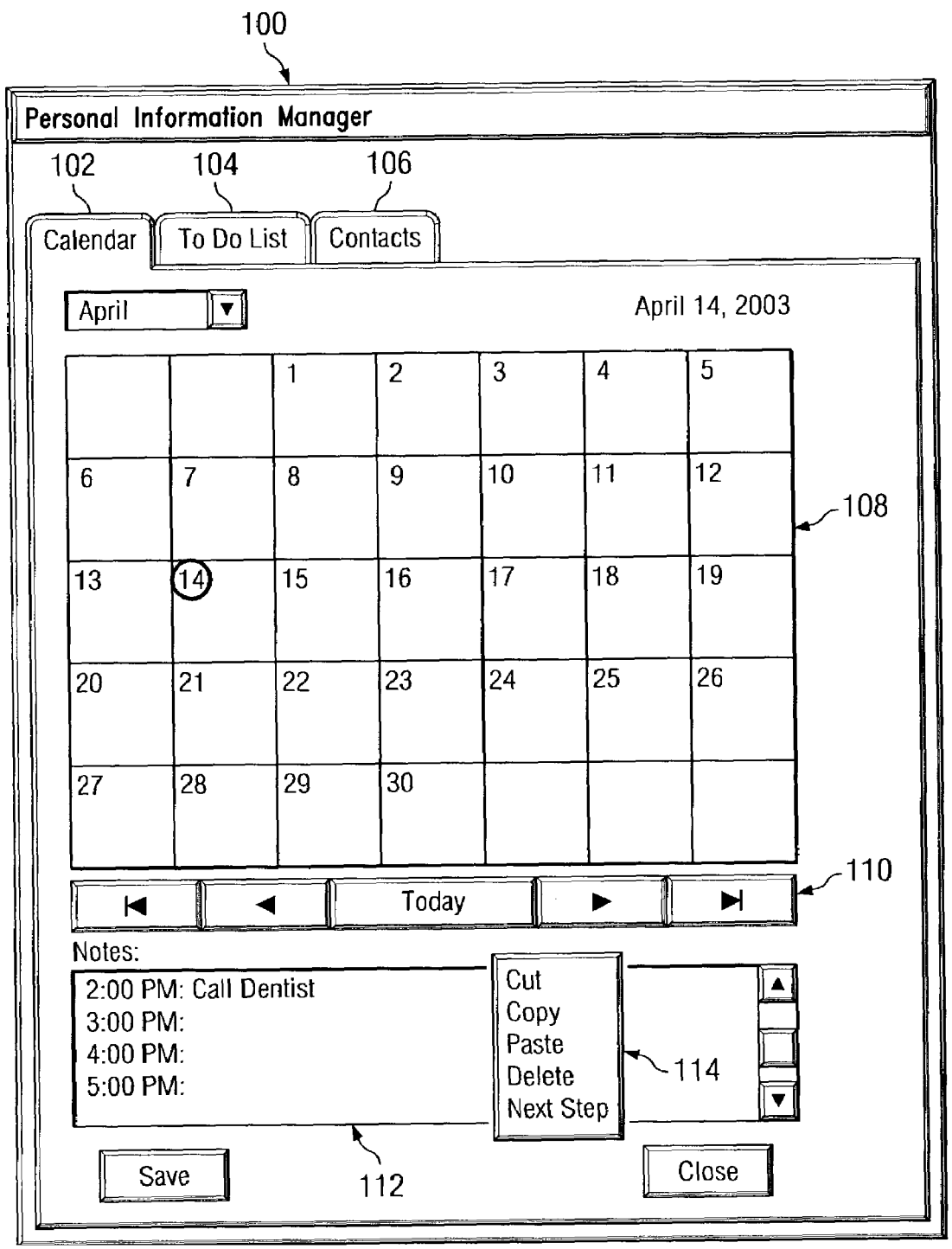
FIG. 3 depicts a display screen generated by a personal information management device application, including a Next Step prompt.
Figure 5:
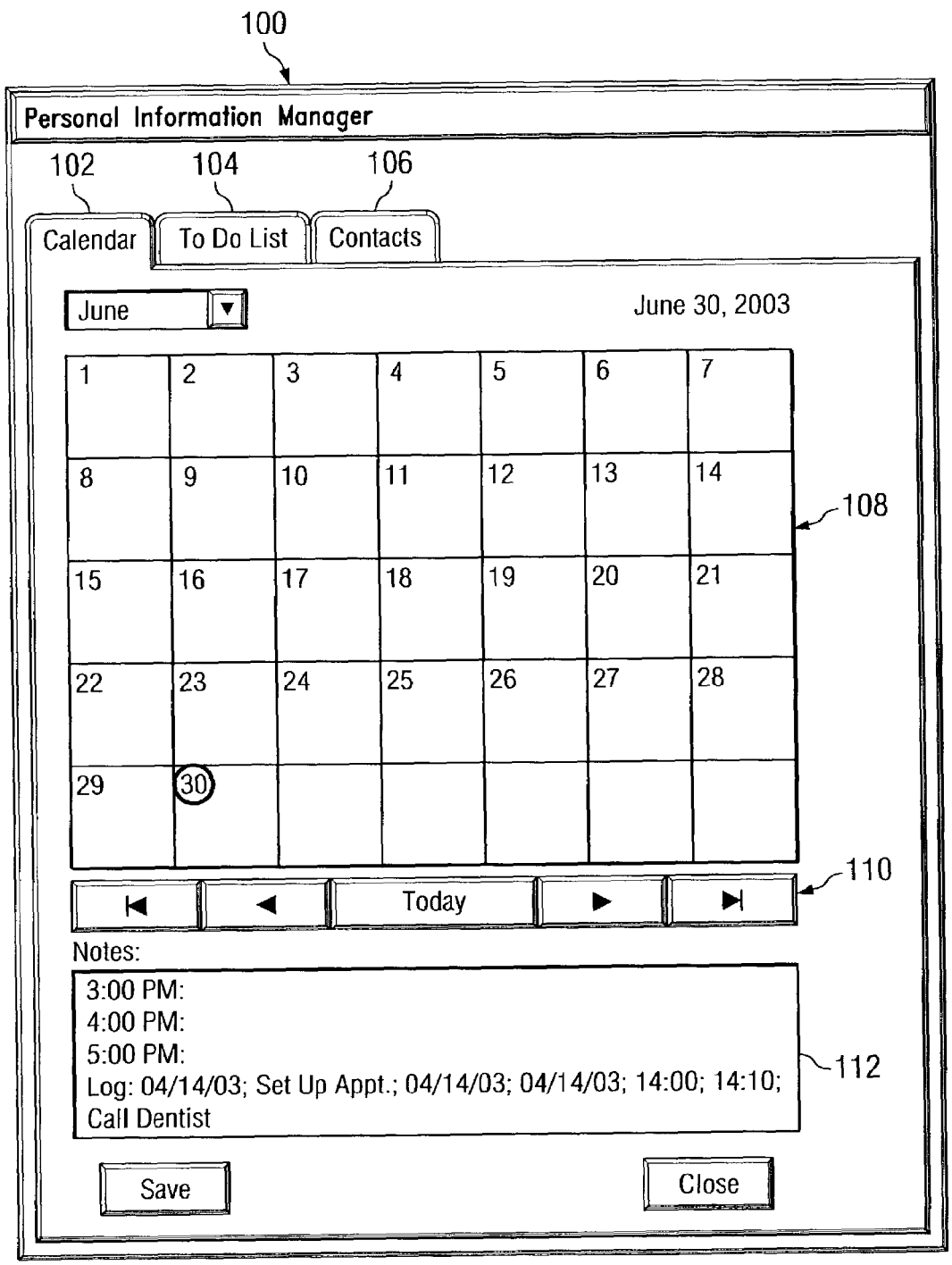
FIG. 5 depicts a display screen generated by a personal information management device application, including display of an audit log.
Figure 6:
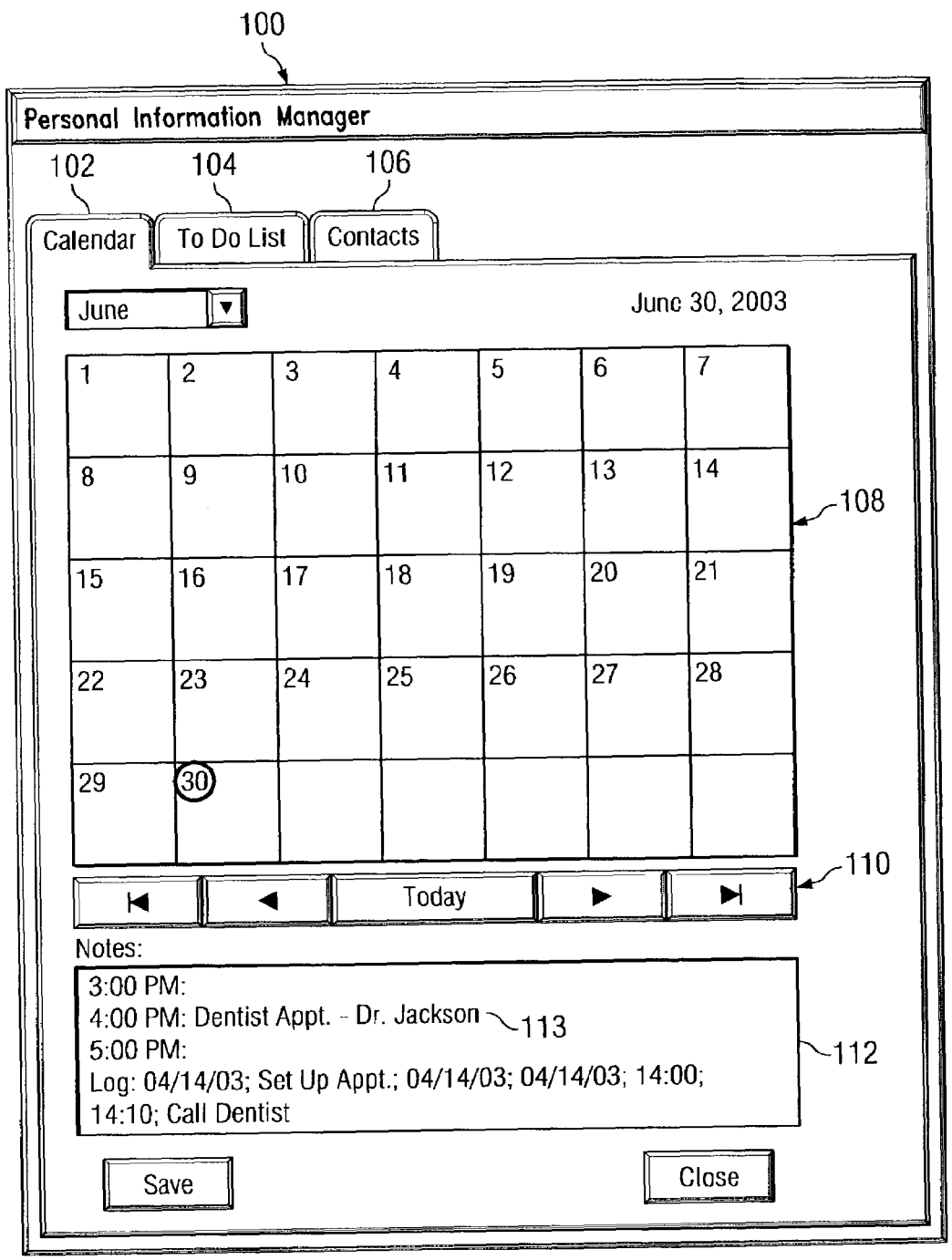
FIG. 6 depicts a display screen generated by a personal information management device application, including display of an audit log and subsequently added additional user information.

A key aspect of the present invention is the ability to automatically create an audit trail or log of PIM application events such as entering items or information into a calendar. Turning now to FIG. 3, a PIM display similar to that previously discussed with respect to FIG. 1 is shown. However, this display shows the results of user interaction with the Notes window 112. In the preferred embodiment, the user invokes the automatic log function by a double-tap and hold action, using a pointing device such as a stylus, finger, mouse or button. In the example shown in FIG. 3, the user taps the 2:00 PM calendar entry shown in Notes window 112, lifts the stylus (or finger or mouse or button), and then taps the calendar entry again. This second tap is held for a short period of time, such as for about a second, which invokes the automatic audit/logging functionality. Once invoked, the information present in the current data record is copied into a temporary buffer, and the user is prompted to make a Next Step selection. This is shown at dialogue box 114 in FIG. 3. Other items can also be displayed in this dialogue box as well, such as Cut, Copy, Paste, and Delete. The user selects the Next Step selection item, and then invokes the next PIM application item. For example, the user may desire to make a calendar entry to enter the scheduled appointment that resulted from their call to the dentist to initially make an appointment. In that case, as shown in FIG. 5, the user has changed the calendar month to June, and then selected the thirtieth ($30^{th}$) day in order to make the dentist appointment entry. Upon selection of the thirtieth day, the automatic logging function (which is now active as a result of the previous double-tap and hold user action) replicates the information from the previous data record (which is now in a temporary buffer) into the current data record for the June thirtieth calendar entry. In the preferred embodiment, the previous data is stored in the Notes field of the new data record, as shown at 132 in FIG. 4. The current date is also pre pended to this replicated information. This replicated information also appears on the PIM display, as shown at 112 in FIG. 5 The user would then proceed to make an appropriate calendar entry for the action item to be completed on Jun. 30, 2003,such as entering the time of the dental appointment. The result of this step is shown at 113 in FIG. 6.

In a similar fashion to that described above, the user could then double-tap and hold the 4:00 PM entry field 113 in window 112, and create yet another Next Step item. The data from the present data record (including the replicated data from the previous data record) would then be replicated to a data record associated with this new Next Step item. In this manner, a complete log or audit trail of all items linked together by several Next Step actions are maintained in a single location. This is particularly useful for large projects having many different calendar entries, as a complete audit trail for an entire project is concisely maintained in a single location.

Figures 10, 11:
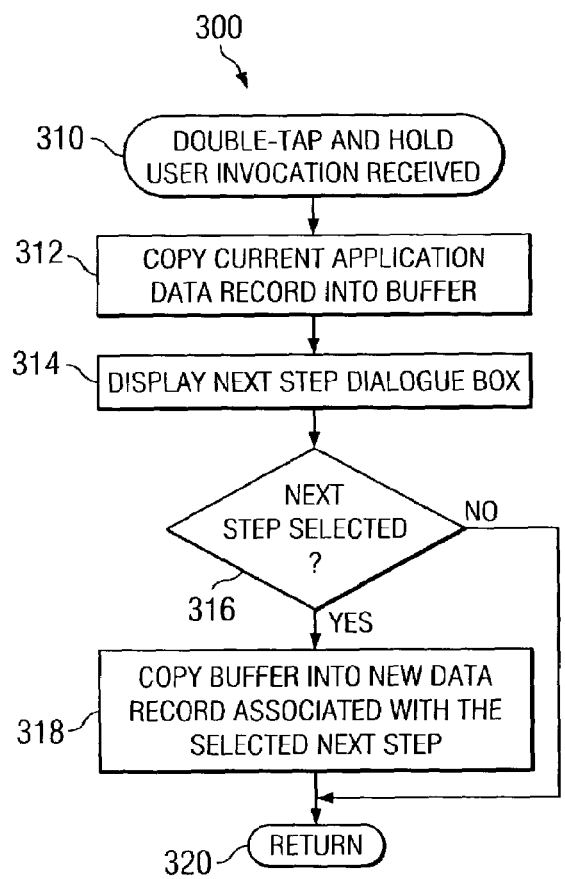
FIG. 10 depicts detailed data entries of a to-do list application data record, including a replicated data and another replicated data record that form an audit log.
FIG. 11 depicts the logical program flow of an audit log plug-in module.

An example of this audit trail chaining for multiple Next Step actions will now be described for a PIM to-do list application. FIG. 7 shows a data record for a PIM to-do list application, including entries for Subject at 222, Start Date at 224, End Date at 226, Percent Complete at 228, Status at 230, and Notes at 232. FIG. 8 shows the resultant to-do list data record after a Next Step has been invoked to make a new to-do list entry. As can be seen in Notes entry 232 in FIG. 8, the data from the various fields shown in FIG. 7 have been copied to the Notes data field 232 shown in FIG. 8. FIG. 9 shows this same data record after the user had entered a new to-do item using the to-do list application. After entry of this second to-do list action item, the user may once again invoke the automatic audit/logging functionality in the same manner as previously described. FIG. 10 shows the resultant data record when such another Next Step action has been invoked after completing the Call Trash Hauler to-do list entry shown in FIG. 9. It is therefore possible to link or chain many actions together, and maintain an audit log of the various sub-activities or tasks of an overall project.

FIG. 11 is a flow chart showing the operation of the PIM plug-in module implementing the present audit log invention. By use of a plug-in module, it is possible to incorporate the present invention with existing PIM devices and their associated applications without having to modify such applications.

The automatic logging function 300 is invoked by a predefined user invocation such as a double-tap and hold of a stylus, finger, mouse or button at 310. Upon invocation, a copy of the current PIM application data record is scraped or copied into a temporary buffer at 312. Next, a dialogue box (such as box 114 of FIG. 3) is presented to the user at 314, asking them to select whether to proceed with a Next Step. If the Next Step is selected, as determined at 316, the data copied from the previous data record is automatically copied to a new data record associated with the user selected Next Step at 318, with the process then returning at 320. Thus, as each successive Next Step is invoked, a log or audit trail is established and maintained in the current Next Step data record. This advantageously allows for deletion of old data records, such as outdated calendar items or completed to-do items, while maintaining an overall audit log in a single, readily available, location.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actuafly used to carry out the distribution. Examples of computer readable media include recordable-type media, such as a floppy disk, a hard disk drive, a RAM, CD-ROMs, and DVD-ROMs. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. For example, while the invention has been described with respect to PIM and PDA devices, it can generally be applied to any type of information management software or system running on any type of computing device including a laptop or desktop computer. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for replicating information in a personal information management system having a plurality of applications, comprising the steps of:

displaying at least some data maintained in a data record, the data record being associated with one of the plurality of applications;

in response to a user interaction with the one application, displaying a user prompt for selection of another of the plurality of applications;

in response to a user selection of the user prompt, replicating the data record in a replicated data record and associating the replicated data record with the another application;

adding additional information to the replicated data record as specified by the user;

in response to another user interaction with the another application, displaying another user prompt; and in response to a user selection of the another user prompt, replicating the replicated data record and the additional information in another replicated data record, and associating the another replicated data record with the another application such that both the replicated data record and the another replicated data record are each maintained as separate data records within the personal information management system.

2. The method of claim 1, wherein the user interaction is a double-tap and hold by the user of an item displayed by the one application.

3. A system for replicating information in a personal information management system having a plurality of applications, comprising:

means for displaying at least some data maintained in a data record, the data record being associated with one of the plurality of applications;

means, in response to a user interaction with the one application, for displaying a user prompt for selection of another of the plurality of applications;

means, in response to a user selection of the user prompt, for replicating the data record in a replicated data record and associating the replicated data record with the another application;

means for adding additional information to the replicated data record as specified by the user;

means, in response to another user interaction with the another application, for displaying another user prompt; and means, in response to a user selection of the another user prompt for replicating the replicated data record and the additional information in another replicated data record, and associating the another replicated data record with the another application such that both the replicated data record and the another replicated data record are each maintained as separate data records within the personal information management system.

4. The system of claim 3, wherein the user interaction is a double-tap and hold by the user of an item displayed by the one application.

5. A computer program product, in a computer readable medium, for replicating information is a personal information management system having a plurality of applications, said computer program product comprising:

means for displaying at least some data maintained in a data record, the data record being associated with one of the plurality of applications;

means, in response to a user interaction with the one application, for displaying a user prompt for selection of another of the plurality of applications;

means, in response to a user selection of the user prompt, for replicating the data record in a replicated data record and associating the replicated data record with the another application;

means for adding additional information to the replicated data record as specified by the user;

means, in response to another user interaction with the another application, for displaying another user prompt; and means, in response to a user selection of the another user prompt, for replicating the replicated data record and the additional information in another replicated data record, and associating the another replicated data record with the another application such that both the replicated data record and the another replicated data record are each maintained as separate data records within the personal information management system.

6. The method of claim 1, further comprising a step of appending a current date to the replicated data record to thereby create an audit log of user actions with the personal information management system.

7. The system of claim 3, further comprising means for appending a cunent date to the replicated data record to thereby create an audit log of user actions with the personal information management system.

8. The method of claim 1, further comprising:

appending a first current date to the replicated data record when replicating the data record; and appending a second current date to the another replicated data record when replicating the replicated data record and the additional information in the another replicated data record, to thereby create an audit log of user actions with the personal information management system.

9. The system of claim 3, further comprising:

first means for appending a first current date to the replicated data record when replicating the data record; and second means for appending a second current date to the another replicated data record when replicating the replicated data record and the additional information in the another replicated data record, to thereby create an audit log of user actions with the personal information management system.

* * * * *